United States Patent [19]

Ecoffet et al.

[11] Patent Number: 5,801,351

[45] Date of Patent: Sep. 1, 1998

[54] METHOD FOR WELDING HINGE PINS ONTO ELEMENTS INTENDED TO FORM HINGED LINKS OF A WRISTLET

[75] Inventors: Roger Ecoffet, Villers-le-Lac, France; Joseph Eray, Glovelier; Sylvain Wenger, Commugny, both of Switzerland

[73] Assignee: Werthanor S.A., Le Locle, Switzerland

[21] Appl. No.: 770,582

[22] Filed: Dec. 19, 1996

[30] Foreign Application Priority Data

Dec. 22, 1995 [CH] Switzerland ............... 03652/95

[51] Int. Cl.⁶ .............................................. B23K 9/00
[52] U.S. Cl. ........................... 219/52; 59/31; 59/80; 219/137 R
[58] Field of Search .................. 219/52, 127, 137 R, 219/51; 59/31, 32, 33, 34, 80, 82

[56] References Cited

U.S. PATENT DOCUMENTS 3,325,991  6/1967  Glendenning ............... 219/52
3,639,722  2/1972  Pagnotta et al. ............ 219/127
4,468,553  8/1984  Brastow et al. .
5,285,659  2/1994  Bardisbanyan ............... 59/80

FOREIGN PATENT DOCUMENTS 626532  8/1927  France .

OTHER PUBLICATIONS

Patent Abstracts of Japan, vol. 8, No. 160 (M–312), Jul. 25, 1984 & JP A 59 056987 (Mizumoto Kikai Seisakusho K.K.) Apr. 2, 1984.

*Primary Examiner*—Clifford C. Shaw
*Attorney, Agent, or Firm*—Sughrue, Mion, Zinn, Macpeak & Seas, PLLC

[57] ABSTRACT

The invention concerns a method for welding hinge pins onto links each formed of one or more elements, the links being connected to each other by means of said hinge pins arranged in passages provided for this purpose in the links, each pin being fixed onto one of the links and hinged onto the next link, characterised in that the connection of the pin to the link is made via an arc welding operation with the aid of an electrode in an inert atmosphere without using a solder.

2 Claims, 1 Drawing Sheet

2

METHOD FOR WELDING HINGE PINS ONTO ELEMENTS INTENDED TO FORM HINGED LINKS OF A WRISTLET

BACKGROUND OF THE INVENTION

The present invention concerns a method for welding hinged links onto elements intended to form hinged links of a wristlet, in particular a watchband.

Metal wristlets comprising hinged links each formed of one or more elements, the links being connected to each other by means of hinge pins arranged in passages provided for this purpose in the lateral faces of the links, are already known. Each pin is fixed onto one of the links and hinged onto the next link. The fixing of the hinge onto the link may be achieved in various ways, namely by driving in, with screws or by welding.

By driving the pins into the links or by using screws to secure the pins to the link, there is the risk that the pins become respectively driven out or unscrewed over time and cause untimely detachment of the links, which can lead to the loss of the wristlet and possibly of the watch attached to the latter. Welding, which assures secure and definitive fixing of the pins onto the links, is therefore generally preferred.

In order to do this, once the pin is set in place in the passage of the link, the visible end of the pin and the lateral face of the link to be soldered are heated locally, then a metal or a metal alloy is used which will act as solder. After this soldering operation, the lateral face of the link is finished by successive grinding and polishing operations which give the link its definitive appearance.

This method of soldering the pins onto the links has however the disadvantage of causing colouring faults to appear in the zone of the solder and of leaving a ring corresponding to the periphery of the pin which is due to the filler metal. Furthermore, it has been noted that the reliability of these solders leaves something to be desired. Indeed, the solders are often subject to corrosion, so that the solder between the pins and the links cannot be absolutely guaranteed and there exists a high risk of the solder and/or the pin breaking.

SUMMARY OF THE INVENTION

An object of the invention is to overcome all these disadvantages by providing a method which leaves no visible trace on the links at the soldering spot after polishing and satin finishing, which can easily be automated, which provides a secure connection barely susceptible to problems of corrosion and which can be implemented simply and inexpensively.

The invention thus concerns a method for welding hinge pins onto links each formed of one or more elements, the links being connected to each other by means of said hinge pins arranged in passages provided for this purpose in the links, each pin being fixed onto one of the links and hinged onto the next link, characterised in that the connection of the pin to the link is made via an arc welding operation with the aid of an electrode in an inert atmosphere without using a solder.

As a result of this welding method, a reliable weld is obtained since this latter, realised in a protected atmosphere, is virtually immune to problems of corrosion. Moreover, this method removes the filler metal management problems of the soldering methods of the prior art.

According to a preferred feature of the method of the invention, the hinge pins project from the lateral face of the links before the welding operation.

According to another preferred feature, the projecting parts of the hinge pins have, at their end, a shape capable of defining a central position of the arc with respect to said pin. Thus the electric arc being produced between the electrode and the hinge pin is centred on this latter and the energy generated by the arc causes the homogenous melting of both the pin and the peripheral zone of the link concerned.

Other features and advantages of the invention will be better described hereinafter, with the aid of the following description of an example of a way of implementing the welding method according to the invention, given purely by way of illustrative example with reference to the attached drawings in which:

DESCRIPTION OF PREFERRED EMBODIMENTS

Figure 1:
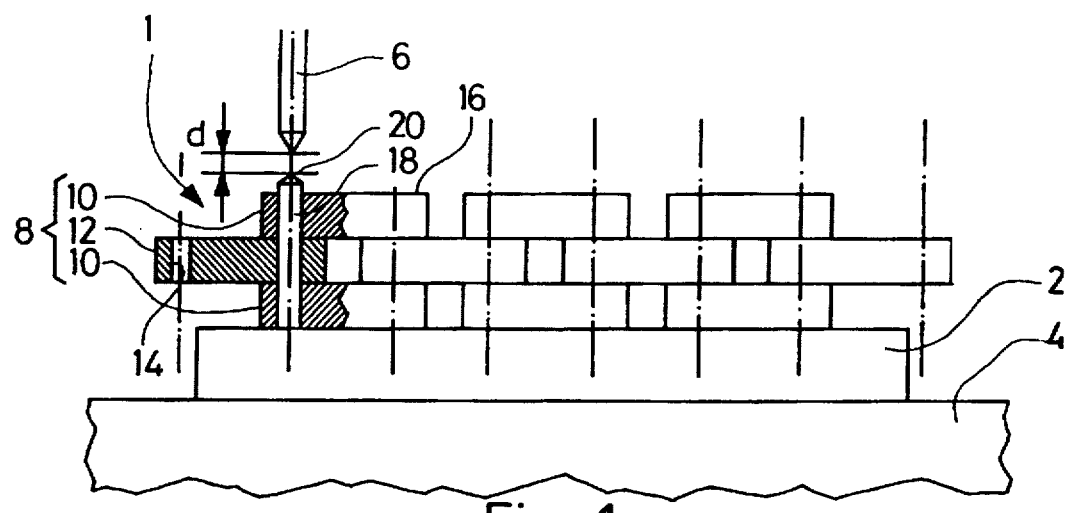
FIG. 1 is a view showing a hinged link wristlet in position on an inert atmosphere arc welding machine, the hinge pins being ready to be welded according to the method of the invention.

Referring to FIG. 1, a wristlet designated by the general reference 1 is seen, placed on a support table 2 of a frame 4 of an inert atmosphere arc welding machine comprising an electrode 6. Such a machine is sold for example by the Castolin company under the brand name Castolig 2000.

In the example shown, wristlet 1 comprises links 8 each formed of three link elements, namely two lateral link elements 10 and one central link element 12 arranged in quincunx with respect to lateral elements 10. Link elements 10 and 12 each comprise in their end part a passage 14 opening out into their lateral face 16 and accommodating a hinge pin 18.

For reasons of convenience, only one hinge pin has been shown in the drawing, the other hinge pins being symbolised by axis lines.

Hinge pins 18 are fixed to lateral elements 10 of links 8. It is thus central elements 12 of links 8 which pivot on hinge pins 18.

According to the invention, the connection of hinge pin 18 onto lateral elements 10 of the links is achieved via an arc welding operation with the aid of an electrode in an inert atmosphere without using a filler metal. The thermal energy for the welding is brought by the electric arc produced between the free end of the electrode and the end or head 20 of pin 18, this thermal energy leading to melting of the metal of the two elements to be welded.

The welding operation is typically achieved in an argon atmosphere with a tungsten electrode which preferably comprises a very small quantity of thorium, typically 4%.

Figures 2, 3, 4:
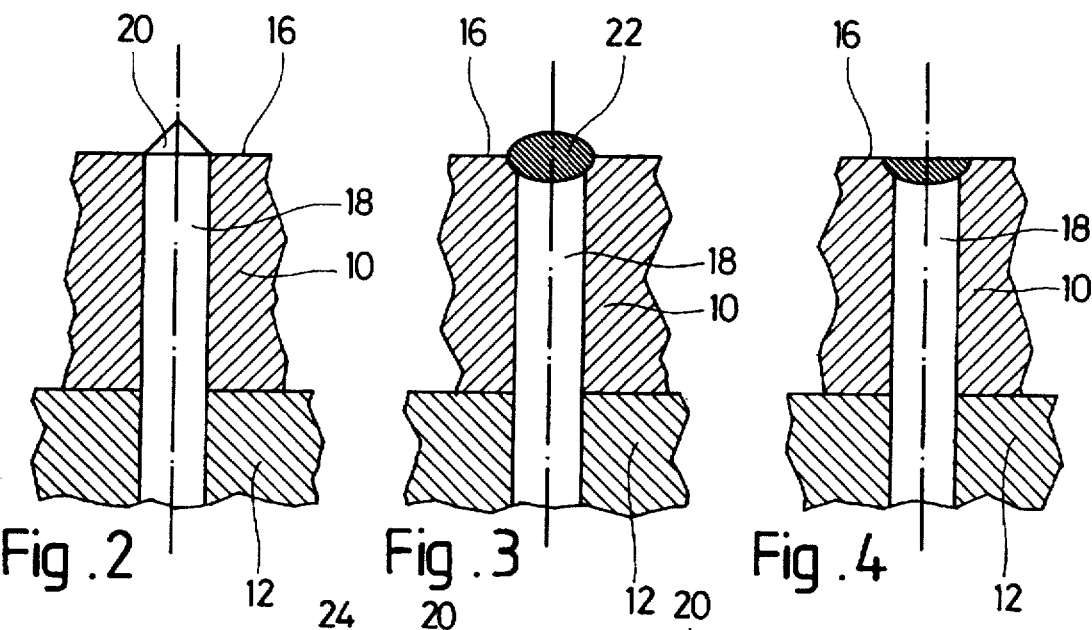
FIGS. 2, 3 and 4 show partial cross-sections of a wristlet link and its hinge pin at various steps of the welding method according to the invention.

As appears clearly from FIGS. 1 and 2, hinge pins 18 are set in place onto the links, before the welding operation and project from lateral face 16 of lateral elements 10 of links 8 via their welding head 20.

Thus, welding head 20 provides a certain quantity of material which will mix locally with the material of element 10 during local melting of such element and the pin to assure a secure connection between them. After this welding operation, the excess material of hinge pin 18 which can be seen in FIG. 3 in the form of a bulb of material 22, is removed during a finishing operation which comprises a sizing operation of the welded link element and a polishing operation.

In this regard, it has been noted that a ratio of the projecting length of hinge pin 18 to its diameter equal to 1.2 mm, led to satisfactory welds.

The projecting parts or welding heads 20 of pins 18 have a shape, for example a conical shape (FIG. 2), capable of defining a central, preferred position of the electric arc with respect to pin 18. In this manner, one favours the formation of the arc between the electrode of the welding machine and a precise point of the pin, and one avoids the weld being offset with respect to the pin leading to an imperfect connection of the pin to the link element.

In the case of welding heads 20 of conical shape, it will be noted that the angle at the apex of the cone varies as a function of the diameter of the pin to be welded increasing with an increase in the diameter of the pin.

Figures 5, 6:
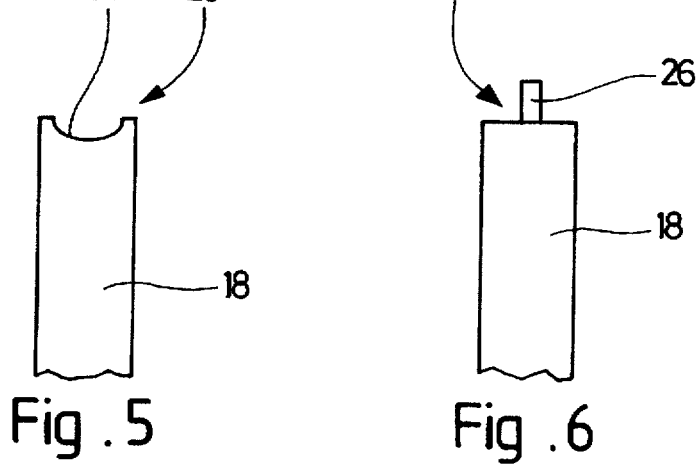
FIGS. 5 and 6 show two alternative embodiments of a hinge pin adapted to the implementation of the method of the invention.

FIG. 5 shows a hinge pin 18 comprising a welding head 20 of a different shape. In this embodiment, welding head 20 comprises a depression 24 in its end face, depression 24 being centred on the longitudinal axis of pin 18.

FIG. 6 shows a hinge pin 18 comprising a welding head 20 of another different shape. In this other embodiment, welding head 20 comprises a stud 26 centred on the longitudinal axis of pin 18.

Of course, any other welding head shape allowing the formation of an arc between the electrode and the pin in a preferred centred position may be envisaged.

It will be noted furthermore that the distance d (FIG. 1) separating the electrode from the end of pin 18 or from welding head 20 plays an important role in the method, and that such distance must be between 0.6 mm and 1 mm and is preferably 0.8 mm. This distance allows in particular the quantity of metal melted in the welding zone to be monitored, which is of great importance given the relatively small thicknesses in play in the welding of hinge pins onto wristlet links. In order to clarify, the diameters of hinge pins are generally in the order of 1.2 mm and the thicknesses of wristlet links are in the order of 2 mm.

As appears from FIG. 1, and in order to avoid the metal of lateral elements 10 of links 8 and of hinge pins 18 running at the moment of welding, which would result in unsatisfactory weld quality, link or links 8 to be welded are positioned on their edge on substantially horizontal support table 2 so that hinge pins 18 extend perpendicularly to support table 2. It will be noted in this regard that support table 2 is formed of a supporting assembly adapted to the particular shape of the links to be welded.

By way of indication, for the welding of steel hinge pins onto steel link elements, for example in X2CrNiMo18-14 (DIN standard) having a diameter of 1.2 mm and overshooting lengths from lateral faces 18 of 0.3 mm, the welding parameters with an electrode of a typical diameter of 1.6 mm are as follows. The flow of inert gas circulating around the electrode is typically 6 liters per hour. The intensity of the current allowing the electric arc to be generated between the electrode and the head of the pin to be welded is between 20 and 25 A, and typically 23 A, and the duration of the electric pulse realising the weld is approximately one second. It will be noted in this regard that the flow of inert gas, here argon, typically starts approximately 0.5 seconds before the welding pulse and continues for a given time, typically approximately 6 seconds, after the pulse.

Finally, it will be noted that the welding method according to the invention has the advantage of being able to monitor simply in a visual manner the quality of the weld. Indeed, if no trace of the weld of the pin onto the link is visible after polishing, the weld is considered good, conversely, if a trace, such as porosity, can be seen, the weld is then considered defective.

What is claimed is:

1. A method of welding elongated hinge pins onto links each formed of one or more elements, the links being connected to each other by means of said elongated hinge pins arranged in passages provided for this purpose in the links, each elongated pin being fixed onto one of the links and hinged onto the next link, wherein a connection of the elongated pin to the link is made via an arc welding operation with the aid of an electrode in an inert atmosphere without using a solder;

wherein said elongated hinge pins have ends projecting from lateral faces of the links, before the welding operation;

wherein the projecting end of each elongated hinge pin has a shape defining a central position of the arc with respect to the longitudinal axis of said elongated pin; and wherein said shape is conical.

2. A method of welding elongated hinge pins onto links each formed of one or more elements, the links being connected to each other by means of said elongated hinge pins arranged in passages provided for this purpose in the links, each elongated pin being fixed onto one of the links and hinged onto the next link, wherein a connection of the elongated pin to the link is made via an arc welding operation with the aid of an electrode in an inert atmosphere without using a solder;

wherein said elongated hinge pins have ends projecting from lateral faces of the links, before the welding operation;

wherein the projecting end of each elongated hinge pin has a shape defining a central position of the arc with respect to the longitudinal axis of said elongated pin; and wherein said projecting end comprises a central stud centered on said longitudinal axis.

* * * * *